(12) United States Patent
Kim et al.

(10) Patent No.: US 9,129,154 B2
(45) Date of Patent: Sep. 8, 2015

(54) GESTURE RECOGNITION APPARATUS, ROBOT SYSTEM INCLUDING THE SAME AND GESTURE RECOGNITION METHOD USING THE SAME

(75) Inventors: Do Hyung Kim, Daejeon (KR); Jae Yeon Lee, Daejeon (KR); Woo Han Yun, Daejeon (KR); Su Young Chi, Daejeon (KR); Ho Sub Yoon, Daejeon (KR); Hye Jin Kim, Daejeon (KR); Young Woo Yoon, Miyang-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 1411 days.

(21) Appl. No.: 12/638,302

(22) Filed: Dec. 15, 2009

(65) Prior Publication Data

US 2011/0001813 A1 Jan. 6, 2011

(30) Foreign Application Priority Data

Jul. 3, 2009 (KR) ........................ 10-2009-0060771

(51) Int. Cl.
*H04N 7/18* (2006.01)
*G06K 9/00* (2006.01)

(52) U.S. Cl.
CPC ................................. *G06K 9/00355* (2013.01)

(58) Field of Classification Search
CPC G05B 19/106; G05B 19/23021; G06F 3/017; G06K 9/00335; H04N 5/44; H04N 21/42201; H04N 21/4223; H04N 5/445; H01H 2217/032

USPC .............. 348/77; 345/158; 382/199; 715/863
See application file for complete search history.

(56) References Cited

U.S. PATENT DOCUMENTS 5,594,469 A * 1/1997 Freeman et al. .............. 345/158
6,144,366 A * 11/2000 Numazaki et al. ............ 345/156
(Continued)

FOREIGN PATENT DOCUMENTS

JP 2007-538318 12/2007
KR 10-0741773 7/2007
(Continued)

OTHER PUBLICATIONS

Choi et at., "Vision-Based Two-Arm Gesture Recognition by Using Longest Common Subsequence", KICS vol. 33, No. 5, May 2008, pp. 371-377.

*Primary Examiner* — Ranodhi Serrao
(74) *Attorney, Agent, or Firm* — Staas & Halsey LLP

(57) ABSTRACT

Provided is a gesture recognition apparatus. The gesture recognition apparatus includes a human detection unit, a gesture region setting region, an arm detection unit and a gesture determination unit. The human detection unit detects a face region of a user from an input image. The gesture region setting unit sets a gesture region, in which a gesture of the user's arm occurs, with respect to the detected face region. The arm detection unit detects an arm region of the user in the gesture region. The gesture determination unit analyzes a position, moving directionality and shape information of the arm region in the gesture region to determine a target gesture of the user. Such a gesture recognition apparatus may be used as a useful means for a human-robot interaction in a long distance where a robot has difficulty in recognizing a user's voice.

11 Claims, 12 Drawing Sheets

(56) References Cited

U.S. PATENT DOCUMENTS

| | | | |
|---|---|---|---|
| 6,850,252 B1* | 2/2005 | Hoffberg | 715/716 |
| 7,203,356 B2* | 4/2007 | Gokturk et al. | 382/154 |
| 7,843,425 B2* | 11/2010 | Lu et al. | 345/156 |
| 8,331,617 B2* | 12/2012 | Lim et al. | 382/103 |
| 2003/0214524 A1* | 11/2003 | Oka | 345/700 |
| 2007/0133880 A1 | 6/2007 | Sun et al. | |
| 2007/0139370 A1* | 6/2007 | Lu et al. | 345/156 |
| 2008/0019589 A1 | 1/2008 | Yoon et al. | |
| 2008/0037875 A1* | 2/2008 | Kim et al. | 382/199 |
| 2009/0055019 A1* | 2/2009 | Stiehl et al. | 700/249 |

FOREIGN PATENT DOCUMENTS

| | | |
|---|---|---|
| KR | 10-0776801 | 11/2007 |
| KR | 10-2008-0026403 | 3/2008 |
| KR | 10-2008-0075514 | 8/2008 |

* cited by examiner

|          | LL | LU | CU | RU | RL |
|----------|----|----|----|----|----|
| Waving   | O  | -  | -  | X  | X  |
| Calling  | O  | -  | -  | X  | X  |
| Raising  | O  | O  | -  | X  | X  |
| Stopping | O  | -  | X  | -  | O  |

GESTURE RECOGNITION APPARATUS, ROBOT SYSTEM INCLUDING THE SAME AND GESTURE RECOGNITION METHOD USING THE SAME

CROSS-REFERENCE TO RELATED APPLICATIONS

This application claims priority under 35 U.S.C. §119 to Korean Patent Application No. 10-2009-0060771, filed on Jul. 3, 2009, in the Korean Intellectual Property Office, the disclosure of which is incorporated herein by reference in its entirety.

TECHNICAL FIELD

The following disclosure relates to an apparatus for recognizing a user's gesture, and in particular, to a gesture recognition apparatus, which recognizes a user's gesture in a daily environment where the user behaves freely, without giving a restriction to the user for recognizing a gesture.

BACKGROUND

The human may exchange much information through nonlanguage means (hereinafter referred to as gestures) such as the expression of a face, the motions of hands, the directions of eyes and the motion of a head. If an information exchange scheme using a gesture is applied to a Human-Robot Interaction (HRI) technology, a human-friendly HRI technology may be better implemented. In this viewpoint, a gesture recognition technology is one of technologies that are attracting much attention, in the HRI technology.

The gesture recognition technology is categorized into a sensor-based gesture recognition technology that attaches sensors to the human body and a vision-based gesture recognition technology using a video camera, according to methods for acquiring data. Among these technologies, the vision-based gesture recognition technology is classified into Two-Dimensional (2D) or Three-Dimensional (3D) recognition according to the dimension of input data, or is classified into the recognition of hand motions, the recognition of an upper body and the recognition of body motions according to a body range for recognition.

An HRI technology based on the existing gesture recognition technology has restrictions below in a gesture recognition method for interaction between a robot and a human in a long distance.

First, existing technologies cannot provide a meaning gesture for interaction between a robot and a human and a method for recognizing the meaning gesture, in a long distance. That is, the existing technologies recognize only hand motions in a near distance, and further focus on recognition based on the recognition of an upper body and body motions than interaction between a robot and a human in a long distance. Accordingly, an attempt is not almost made on vision-based gesture recognition for HRI, in a long distance.

Second, the existing technologies require the input video of high resolution for recognizing the upper body or body gesture of a human that is in a long distance, or require two or more cameras and devices corresponding to them for obtaining 3D information. Accordingly, it is difficult to implement a low-cost system that is configured with a single camera.

Third, in a case of using only a single camera, the existing technologies mostly fix cameras for easily extracting input videos. Accordingly, it is difficult to apply the HRI technology based on a gesture recognition technology to a robot platform in which cameras move.

Fourth, the existing technologies require many restrictions to users for securing the stability of a system that recognizes gestures. For example, for allowing a system to know the start time and end time of a gesture, users mainly wear auxiliary items such as gloves and clothes having specific colors. However, it is difficult to expect the users to give the above-described cooperation for the stability of recognition, in a daily robot service environment where users behave freely.

Accordingly, the existing HRI technology based on a gesture recognition technology has limitations in providing a meaning gesture recognition method for interaction between a robot and a human in a long distance.

SUMMARY

In one general aspect, a gesture recognition apparatus includes: a human detection unit detecting a face region of a user from an input image; a gesture region setting unit setting a gesture region, in which a gesture of the user's arm occurs, with respect to the detected face region; an arm detection unit detecting an arm region of the user in the gesture region; and a gesture determination unit analyzing a position, moving directionality and shape information of the arm region in the gesture region to determine a target gesture of the user.

In another general aspect, a robot system, which includes a moving means and implements a human-robot interaction, includes: a single camera acquiring a low-resolution input image which includes a user disposed in a certain long distance; and a gesture recognition apparatus recognizing a target gesture of the user, wherein the gesture recognition apparatus includes: a human detection unit detecting a face region of the user from an input image; a gesture region setting unit setting a gesture region, in which a gesture of the user's arm occurs, with respect to the detected face region; a background image acquisition unit acquiring a background image for stably detecting an arm region of the user in the set gesture region; an arm detection unit detecting an arm region of the user in the gesture region by using the acquired background image; and a gesture determination unit analyzing a position, moving directionality and shape information of the arm region in the gesture region to determine a target gesture of the user.

In another general aspect, a gesture recognition method using a robot system, which includes a moving means and in which a human-robot interaction technology is implemented, includes: detecting a face region of a user from an input image which is sequentially inputted; calculating a size of a gesture region, in which a gesture of the user's arm occurs, at a certain rate on the basis of a position and size of the detected face region; acquiring a background subtraction image which includes an arm region of the user in the calculated gesture region; detecting the arm region of the user in the gesture region by using the acquired background subtraction image; and analyzing a position, moving directionality and shape information of the arm region in the gesture region to determine a target gesture of the user which includes a waving gesture, a calling gesture, a raising gesture and a stopping gesture.

Other features and aspects will be apparent from the following detailed description, the drawings, and the claims.

DETAILED DESCRIPTION OF EMBODIMENTS

Figure 1:
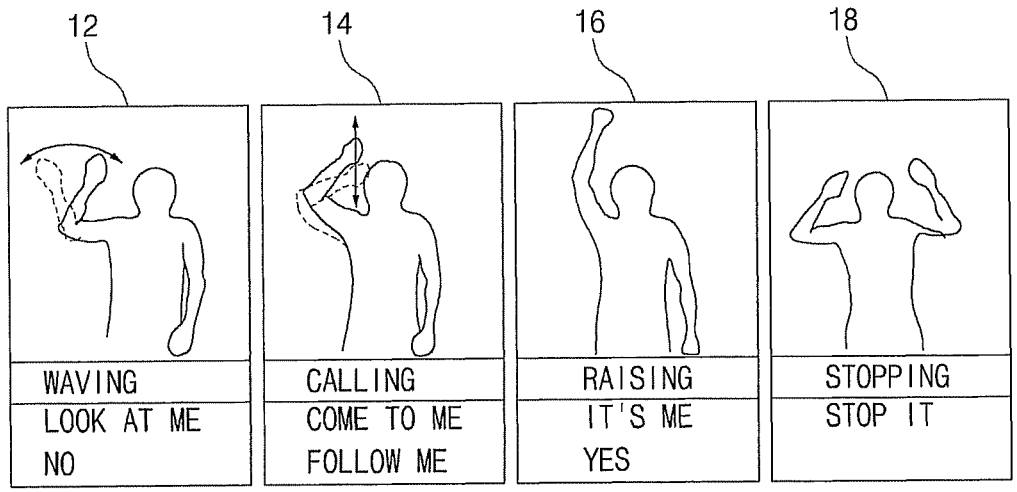
FIG. 1 is a diagram illustrating the target gestures of a user which are recognized in a gesture recognition apparatus according to an exemplary embodiment.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

A gesture recognition apparatus according to an exemplary embodiment may be applied to various technology fields, which recognize users, such as intelligent robots and security detection systems. In exemplary embodiments, the gesture recognition apparatus will be described below on the assumption of that it is mounted on an intelligent robot having a movement means.

In the case of a near distance, a robot recognizes a user's voice and thereby the intention between the robot and the user may be expressed. In a long distance where it is difficult to recognize voice, however, recognition for the user's gesture may become expression useful. Accordingly, the gesture recognition apparatus according to an exemplary embodiment proposes a method that recognizes a user's intention through the user's gesture (for example, arm gestures).

Moreover, the gesture recognition apparatus according to an exemplary embodiment provides a method that may recognize a user's gesture for interaction between a robot and the user in a long distance where the distance between the robot and the user is about 4 m to 5 m, and simultaneously, proposes a method that may recognize the user's gesture through the input video of low resolution that is obtained from a single camera.

Furthermore, the gesture recognition apparatus according to an exemplary embodiment does not require a restriction to a user for recognizing a user's gesture, and proposes a method that may discriminate gestures that are recognized by it and gestures in the daily behaviors of the user.

Hereinafter, exemplary embodiments will be described in detail with reference to the accompanying drawings.

Figure 2:
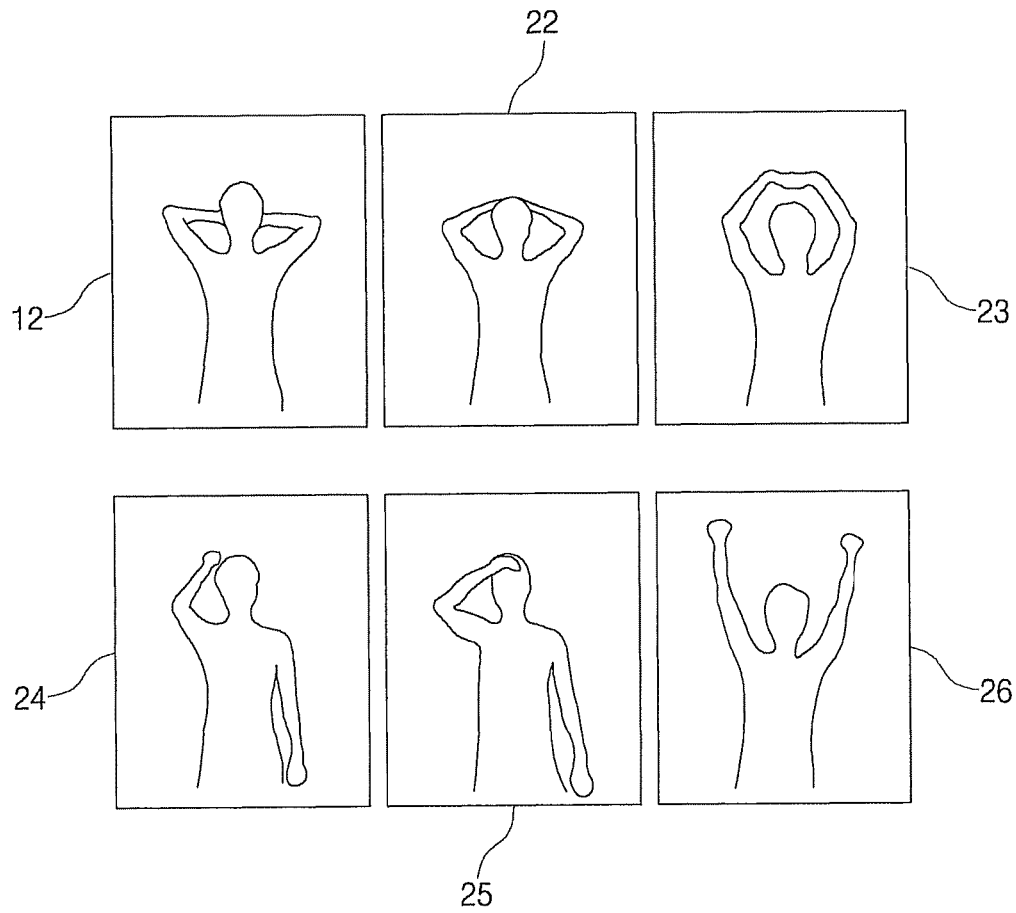
FIG. 2 is a diagram illustrating the noise gestures of a user instead of the target gestures of a user which are recognized in a gesture recognition apparatus according to an exemplary embodiment.

FIG. 1 is a diagram illustrating the target gestures of a user which are recognized in a gesture recognition apparatus according to an exemplary embodiment. FIG. 2 is a diagram illustrating the noise gestures of a user instead of the target gestures of a user which are recognized in a gesture recognition apparatus according to an exemplary embodiment.

Referring to FIG. 1, a gesture recognition apparatus 100 according to an exemplary embodiment sets the specific gestures of a user as recognition targets for human-robot interaction in a long distance. In this embodiment, the gesture recognition apparatus 100 recognizes total four target gestures that are composed of a motion gesture including a waving gesture 12 and a calling gesture 14 and a non-motion gesture including a raising gesture 16 and a stopping gesture 18. Herein, the waving gesture 12 and the calling gesture 14 which are included in the motion gesture may be gestures using a right arm or gestures using a left arm according to a user's habit. In this embodiment, the waving gesture 12 and the calling gesture 14 are defined as gestures using the right hand.

The waving gesture 12 is a behavior in which a user shakes its right arm from side to side, and is the user's gesture for attracting the attention of a robot that is disposed in a long distance. For example, the waving gesture 12 may be used as expression (for example, "look at me") in which the user transfers a service request to the robot in a long distance or expression (for example, "no") that indicates "no". That is, the waving gesture 10 is one in which the robot checks the intention of the user before providing an active service to the user.

The calling gesture 14 is one in which a user shakes its right arm downward and upward. For example, the calling gesture 14 may be used as expression (for example, "come to me") that allows a robot in a long distance to come up close to the user or expression (for example, "follow me") that allows the robot to follow the user.

The raising gesture 16 is one in which a user stops for a certain time (for example, about 2 sec to 3 sec) in a state of holding up its right arm. For example, the raising gesture 16 may be used as expression (for example, "it's me") that allows a robot to recognize the user or expression (for example, "yes") in which the user expresses a yes to the robot before the robot provides an active service to the user.

The stopping gesture 18 is one in which a user stops for a certain time (for example, about 2 sec to 3 sec) in a state that is holding up its both arms to face height. For example, the stopping gesture 18 may be used as expression (for example, "stop it") in which the user requests the stopping of a specific service to the robot while the robot in a long distance is providing the specific service for the user.

The above-defined four target gestures (which include the waving gesture 12, the calling gesture 14, the raising gesture 16 and the stopping gesture 18) are gestures in which a user expresses its own intention to a robot. Accordingly, the user may look directly at the robot. Such a user's behavior (i.e., a behavior in which the user looks directly at the robot), however, should be interpreted as a natural motion that occurs at a point when the user begins the above-described gestures (which include the waving gesture 12, the calling gesture 14, the raising gesture 16 and the stopping gesture 18) that may be recognized by the robot, and is not interpreted as a behavior that requests a specific restriction to the user.

As described above, the gesture recognition apparatus 100 according to an exemplary embodiment recognizes the above-described four target gestures in a robot environment where a user behaves freely. However, the user may take a behavior corresponding to the daily gesture (for example, a noise gesture) of the user instead of the four target gestures that are recognized by the gesture recognition apparatus 100. Accordingly, the gesture recognition apparatus 100 according to an exemplary embodiment provides a method that may discriminate the six daily gestures 21 to 26 in FIG. 2 and the four target gestures.

Figure 3:
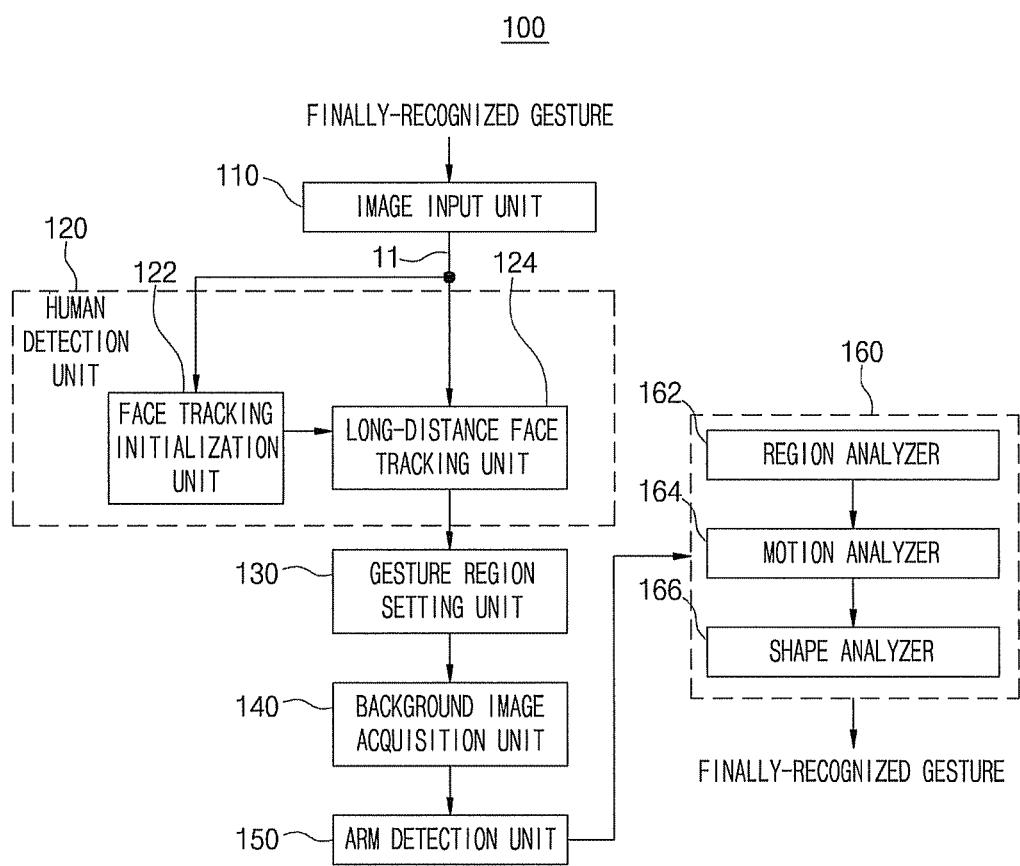
FIG. 3 a block diagram illustrating a gesture recognition apparatus according to an exemplary embodiment.

FIG. 3 a block diagram illustrating a gesture recognition apparatus according to an exemplary embodiment.

Referring to FIG. 3, a gesture recognition apparatus 100 according to an exemplary embodiment includes an image input unit 110, a human detection unit 120, a gesture region setting unit 130, a background image acquisition unit 140, an arm detection unit 150 and a gesture determination unit 160.

The image input unit 110 receives the video image of low resolution, which is provided from a single camera that is disposed in an arbitrary environment or a robot, to sequentially generate a plurality of image frames. The human detection unit 120 detects whether a user exists from each of the image frames that are sequentially generated, and when the user exists, the human detection unit 120 detects the position and size of the user's face. The gesture region setting unit 130 sets a gesture region in which the user's gesture may occur with respect to the position of face region of the user that is detected by the human detection unit 120. The background image acquisition unit 140 acquires a background image for obtaining the arm region of the user that exists in the set gesture region. The arm detection unit 150 detects an arm region existing in the background image that is acquired by the background image acquisition unit 140. The gesture determination unit 160 analyzes the disposed region, motion and posture of the arm in the arm region that is detected by the arm detection unit 150, and finally recognizes the analysis result as the user's gesture.

Hereinafter, the gesture recognition apparatus 100 according to an exemplary embodiment will be described in more detail.

The image input unit 110 generates a low-resolution image having the resolution of 320×240 pixels through a single internal camera, wherein 320 is the number of vertical pixels and 240 is the number of horizontal pixels.

The human detection unit 120 continuously receives the plurality of image frames, and when the user exists in each of the image frames, the human detection unit 120 detects the position of the user's face. The human detection unit 120 is a module for stably detecting and tracking the position of face of the user in a long distance. The human detection unit 120 combines a result of mean shift color tracking, a result of near-distance face detection, a result of omega detection and a result of long-distance face detection to continuously calculate the position of face region of the user.

Specifically, the human detection unit 120 includes a face tracking initialization unit 122 and a long-distance face tracking unit 124.

The face tracking initialization unit 122 will be described as follows. First, the face tracking initialization unit 122 continuously receives a plurality of image frames 11 in frame units through the image input unit 110. A motion region is detected through the difference image frame between the image frames that are continuously generated.

An upper body region, in which there is much possibility that a face and an omega shape exist in the detected motion region, is set according to a predetermined rate. Herein, the omega shape is named because the shape of a contour that joins the head and shoulders of the user is similar to the character omega) ($\Omega$).

For verifying whether a moving object is a person or not, a face detection operation is performed in an upper body region.

A face is a characteristic component for determining whether an object is a person or not. In this embodiment, a face detection operation is performed in an adaboosting technique. The face detection operation using the adaboosting technique is trained (i.e., learned) in order to stably detect the face of the minimum 20×20 resolution.

The face detection operation using the adaboosting technique is described in detail in the paper "Robust real-time face detection using face certainty map, Proceeding of the 2nd In'l. Conf. on Biometrics, vol. 4642, pp. 29-38, 2007", presented by B. Jun and a Kim, and thus its detailed description will be omitted.

When face detection is achieved through the face detection operation based on the adaboosting technique, a detected face region is set as a tracking start region.

The long-distance face tracking unit 124 performs tracking with respect to the set tracking start region. When face detection is failed, a detection operation for an omega ($\Omega$) shape is performed in the set upper body region.

In the case of the omega shape, the accuracy of detection is lower than a face. In the omega shape, however, detection may be achieved even in a case where a person at the front of a camera turns its back on the camera, i.e., a case where a face is not seen. The omega shape has a characteristic component that has a larger size than a face. Accordingly, detection may be achieved even in a long distance.

In this embodiment, the adaboosting technique may be used even in the above-described omega detection operation. The omega detection operation according to an exemplary embodiment is trained (i.e., learned) in order to detect the omega shape of the minimum 24×24 resolution.

When the detection of the omega shape is achieved, i.e., when a moving object is verified as a person, a face (or the back of the head) region is estimated in rate with respect to an omega region.

The estimated face (or the back of the head) is set as a tracking start region that is provided to the long-distance face tracking unit 124.

In the human detection unit 120, as described above, an estimation region is limited to an upper body region for detecting the face region and the omega region. Consequently, a detection speed is improved and the possibility of misdetection is maximally reduced.

When the detection of the face region and the detection of the omega region is failed, the gesture recognition apparatus 100 receives a next image frame to verify whether an object is a person or not, and repeats a series of operations for setting a tracking start region. When a user is checked to be in the face tracking initialization unit 122 and thereby the tracking start region is set, the long-distance face tracking unit 124 performs a series of face tracking operations from a next image frame with respect to a current image frame in which the tracking start region is set.

The long-distance face tracking unit 124 combines a result of mean shift color tracking, a result of near-distance face detection, a result of omega detection and a result of long-distance face detection to continuously calculate the position of the face region that is tracked, based on a region set by the face tracking initialization unit 122.

Specifically, when the long-distance face tracking unit 124 receives a tracking start region and an image frame, it first performs color tracking through a mean shift scheme (D. Comaniciu and P. Meer, "Mean shift: a robust approach toward feature space analysis", IEEE Trans. on PAMI, vol. 24, no. 5, May. 2002.)

For color tracking, a color model to be tracked at an initial stage should exist. The color model is modeled in color in the tracking start region that is set by the face tracking initialization unit 122. That is, when a face is detected by the face tracking initialization unit 122, initial modeling is performed in color in the detected face region. When a face (or the back of the head) region is estimated through omega detection, initial modeling is performed in color in the estimated region. A mean shift-based color tracking technique calculates a region, having color that is most similar to a set color model, as a result. The mean shift-based color tracking technique is vulnerable to the change of lighting because of using color information. When color similar to color for tracking exists in a background, the accuracy of tracking is low. In this embodiment, accordingly, the mean shift-based color tracking technique is used for the purpose of setting an estimation region for the detection of a face shape and the detection of an omega shape, instead of the purpose for detecting a face (or a head). When a face estimation region is set, face detection is performed in the set region. At this point, face detection may be achieved up to the face region of a 20×20 pixel size that is the same as that of the face tracking initialization unit 122.

Referring continuously to FIG. 3, when the face region of the user is detected by the human detection unit 120, the gesture region setting unit 130 sets regions of interest (hereinafter referred to as an ROI region), in which the above-described target gestures 12, 14, 16 and 18 may occur, with respect to the detected face region.

Figure 4:
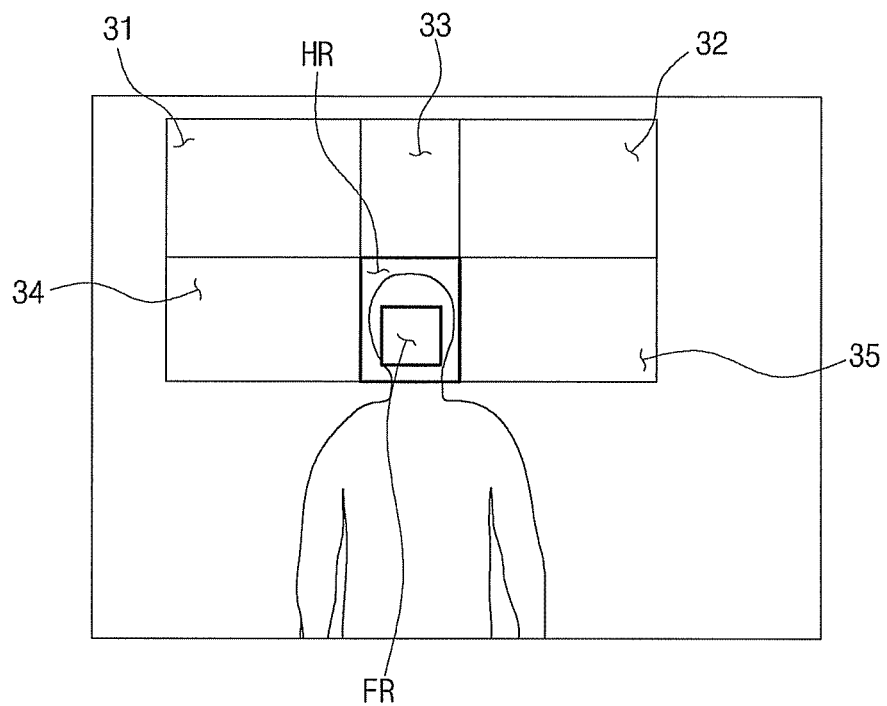
FIG. 4 is a diagram illustrating a region in which target gestures according to an exemplary embodiment may occur.

FIG. 4 is a diagram illustrating a region in which target gestures according to an exemplary embodiment may occur.

Referring to FIG. 4, the gesture region setting unit 130 sets a head region HR including a face region FR that is detected by the human detection unit 120, and a peripheral region adjacent to the set head region is set.

The peripheral region is one in which there is much possibility that a target gesture occurs, and includes five ROI regions.

Specifically, the peripheral region includes five ROI regions that are composed of a left upper region 31 (hereinafter referred to as an LU region), a right upper region 32 (hereinafter referred to as an RU region), a center upper region 33 (hereinafter referred to as a CU region) between the LU region and the RU region, a left lower region 34 (hereinafter referred to as an LL region) adjacent to the lower portion of the LU region 31 and a right lower region 35 (hereinafter referred to as an RL region) adjacent to the lower of the RU region 32.

The size of each of the regions 31 to 35 is calculated at a predetermined rate according to the position and size of a detected face region. In this embodiment, it is assumed that the four target gestures appear only in the set ROI regions and do not appear in regions other than the ROI regions.

Referring again to FIG. 3, when the ROI regions 31 to 35 are set by the gesture region setting unit 130, the background image acquisition unit 140 acquires the each background image of the ROI regions 31 to 35.

Figure 5A:
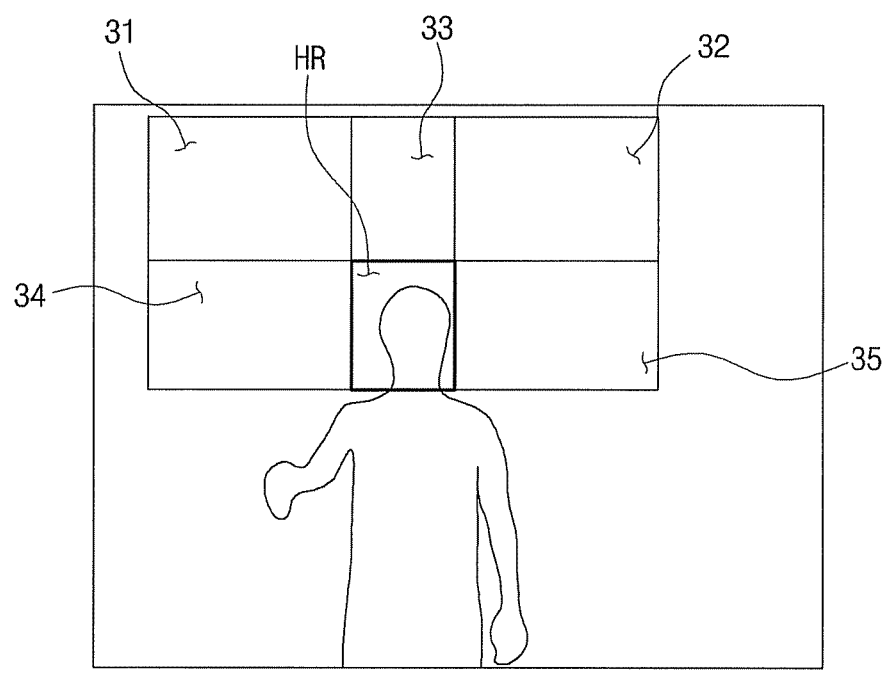
FIGS. 5A to 5C are diagrams illustrating operations of dividing the arm region of a user which is divided in an region of interest according to a background subtraction technique.
Figure 5B:
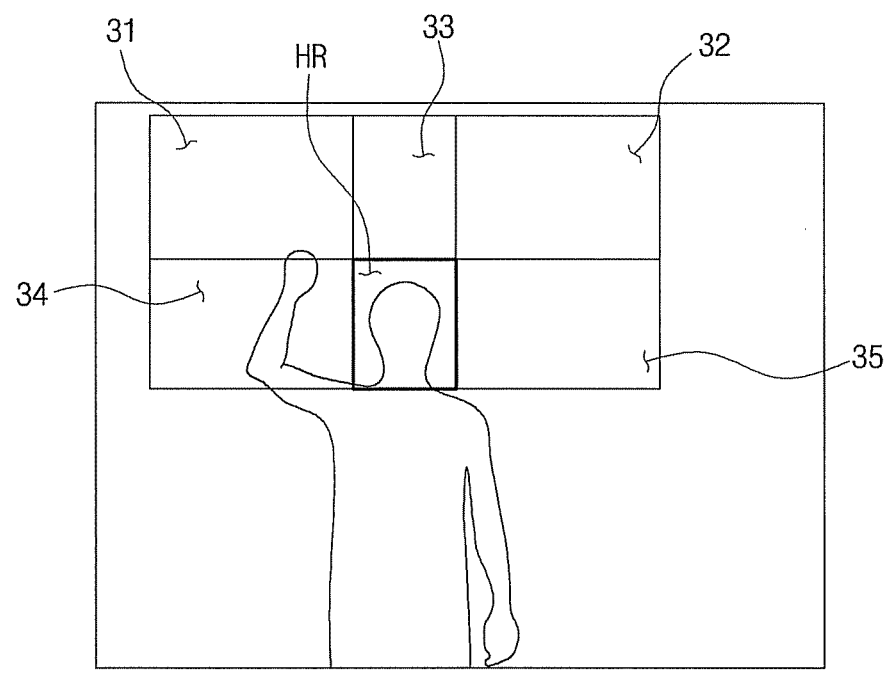
Figure 5C:
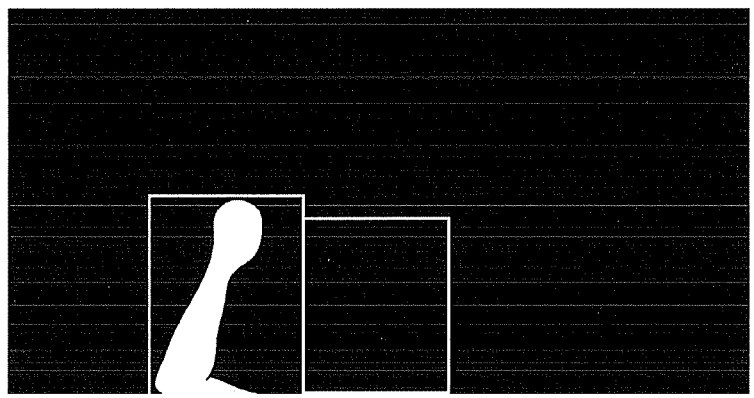

FIGS. 5A to 5C are diagrams illustrating operations of dividing the arm region of a user which is divided in an region of interest according to a background subtraction technique.

Referring to FIGS. 5A to 5C, the background image acquisition unit 140 checks whether a user's arm exists in the ROI regions through the background subtraction technique. The background subtraction technique is one that has been widely known, and thus its detailed description will be omitted.

As shown in FIG. 5A, when a user's arm is not in the ROI regions, the background image acquisition unit 140 updates a current image to a background image. When the user's arm exists in the ROI region 34 as shown in FIG. 5B, the final image from which an arm region is separated is generated through the background subtraction technique. That is, by subtracting the gray value of each pixel that configures a background image in FIG. 5B and the gray value of each pixel that configures a background image in FIG. 5A, the final image in which only the arm region appears is generated as shown in FIG. 5C.

Figures 6, 7:
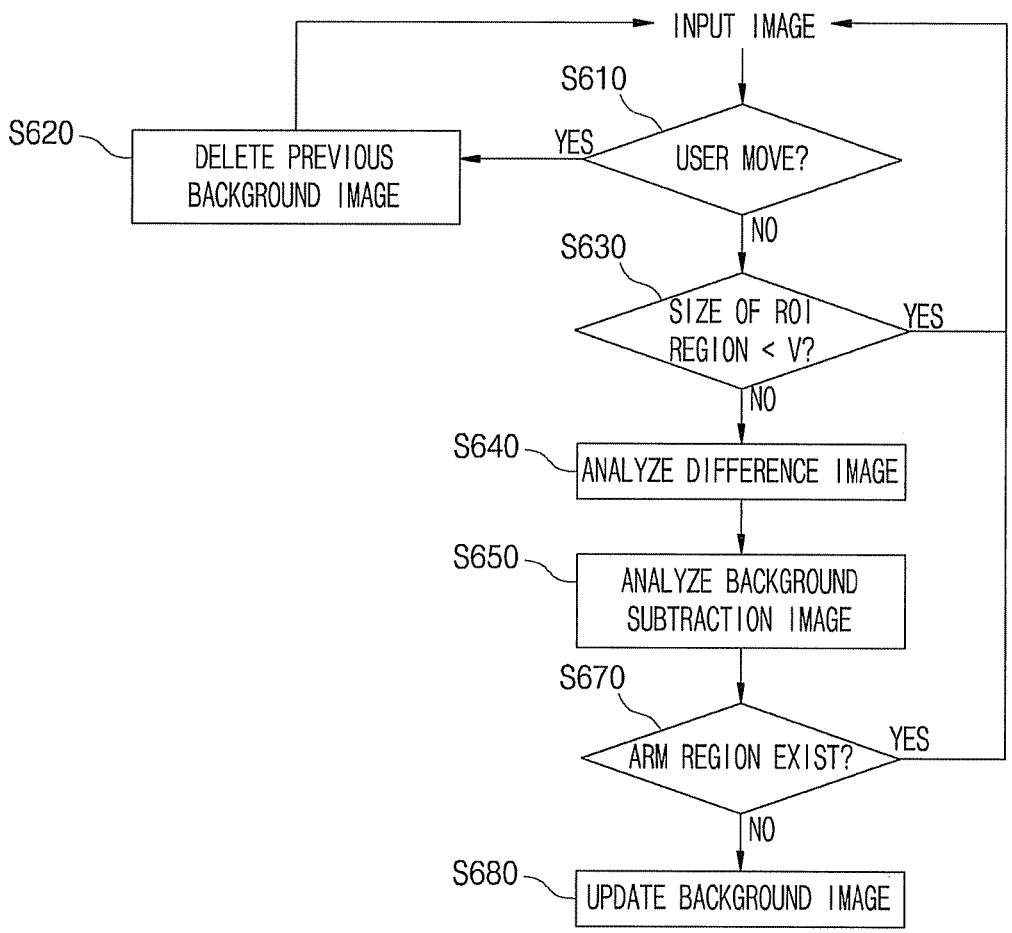
FIG. 6 is a flow chart illustrating the operation of a background image acquisition unit in FIG. 3.
FIG. 7 is a diagram illustrating a lookup table which is used for discriminating a target gesture and a noise gesture.

FIG. 6 is a flow chart illustrating the operation of the background image acquisition unit in FIG. 3.

Referring to FIG. 6, when an image frame in which an ROI region and a face region is set is received from the gesture region setting unit 130, the background image acquisition unit 140 first determines whether a use is in a stop state or a moving state in operation S610.

In this embodiment, since the gesture recognition apparatus 100 in FIG. 1 recognizes the gesture of a user that takes a gesture toward a robot in a stop state, an acquired previous background image is deleted when the user is moving.

In determining whether the user moves, the user is determined as that in which it is moving when the size of an area, where the set head region of a current image and the head region of a background image overlap, is less than a predetermined critical value.

When the user stops moving, an ROI region is set with respect to a detected face region. At this point, the user's face is disposed at the edge of a screen, or when the user very closely approaches the robot, the ROI region gets out of an entire image. Consequently, whether the gesture of the user's arm occurs may not be determined. When the size of the ROI region is less than a predetermined critical value (V), accordingly, an operation of acquiring the background image is not performed, and the background image acquisition unit 140 again receives an entire image in operation S630.

When the user is in a stop state and the ROI region is stably obtained, the background image acquisition unit 140 checks whether an arm exists in the ROI region. For checking whether an arm exists, an operation of analyzing a difference image and an operation of analyzing a background subtraction image are performed in operations S640 and S650.

The operation of analyzing the difference image analyzes whether a motion occurs through the difference value between the pixel of a current image and the pixel of a previous image. Herein, a technique using the difference value of the pixel is one that analyzes whether the motion occurs through the gray value of pixel of the current image and the gray value of pixel of the previous image corresponding to the pixel of the current image in operation S640.

When the motion does not occur, it may be determined that an arm is not in the ROI region. When an arm that is moving in the ROI region stops moving and is in a stop state, whether the arm exists may not be checked by analyzing only the difference image. In this case, whether an arm that does not move exists may be checked by analyzing a background subtraction image which is the pixel difference between a current image and a background image that has been set before in operation S670.

When there is no arm that moves in the ROI region or is in a stop state, the current image is finally reset (i.e., updated) to the background image in operation S680.

When the background image is acquired, as shown in FIG. 5C, an arm region is detected in the background subtraction technique.

Because a background image is acquired once from an entire image, in which a user does not exit, at an initial stage, it is impossible to apply existing technologies in a robot environment where a camera moves. In this embodiment, however, the gesture recognition apparatus 100 checks whether an arm only exists for an ROI region that is set with respect to the face region of a user unlike the existing technology, thereby adaptively updating a background image.

Accordingly, if a robot maintains a stop state only the moment a user takes a gesture while the user and the robot is moving freely, the gesture recognition apparatus 100 in FIG. 1 may be applied to a robot environment.

Referring again to FIG. 3, when an arm region in any one of ROI regions is stably obtained as shown in FIG. 5C, the gesture determination unit 160 determines whether a gesture occurs. For determining whether a gesture occurs, the gesture determination unit 160 includes a region analyzer 162, a motion analyzer 164 and a shape analyzer 166.

The region analyzer 162 analyzes whether a detected arm region (or an arm blob) is disposed in any one of the five ROI regions 31 to 35 that have been set in FIG. 4, and discriminates a noise gesture, being the daily behavior of a user, instead of target gestures through a lookup table in FIG. 7.

FIG. 7 is a diagram illustrating a lookup table which is used for discriminating a target gesture and a noise gesture. In a lookup table in FIG. 7, the sign 'O' is one representing that an arm blob is in a corresponding ROI region, the sign 'X' is one representing that an arm blob is not in a corresponding ROI region. The sign '-' is one representing that an arm blob may or may not exist in a corresponding ROI region. That is, the sign '-' is one that denotes a "don't care" state.

Referring to FIGS. 7 and 4, when a user takes the waving gesture 12 (see FIG. 1) through its right hand, an arm blob necessarily appears in the LL region 34 (see FIG. 4) and does not appear in the RU and RL regions 32 and 35 (see FIG. 4).

An arm blob may or may not appear in the LU region 31 (see FIG. 4) or the CU region 33 (see FIG. 4) according to a user's habit.

In this way, when an arm blob is detected, an arm blob that satisfies all conditions for four gestures listed in the lookup table is determined as a noise gesture by analyzing the ROI region.

Referring again to FIG. 3, the region analyzer 162 cannot completely perform a function for recognizing any one of the four target gestures according to this embodiment, and merely performs a function for discriminating a noise gesture that is a target gesture. Despite this, designing the region analyzer 162 prevents misrecognition for a gesture that occurs because an entire system performs a necessary analysis, and minimizes necessary operations based on gesture recognition.

The motion analyzer 164 analyzes the moving directionality of a detected arm blob to analyze whether the waving gesture 12 and the calling gesture 14 corresponding to the motion gesture among the four target gestures 12 to 18 (see FIG. 1) occur. The waving gesture 12 and the calling gesture 14, as described above, are defined as gestures that a user takes using its right arm. Accordingly, the motion analyzer 164 checks whether the user repeatedly shakes its right arm from side to side or upward and downward, and determines whether the motion gesture occurs through a result of the check.

Figure 8A:
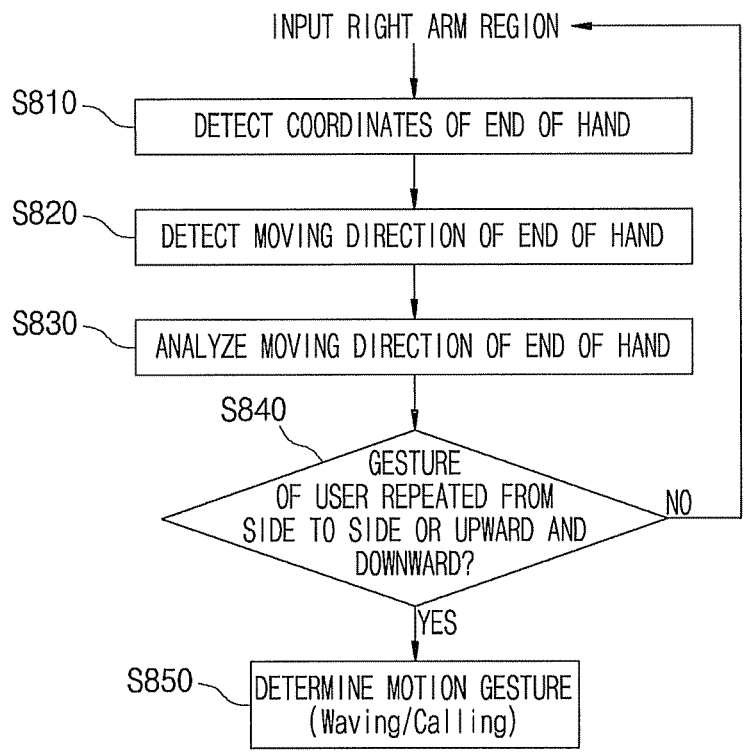
FIG. 8A is a flow chart illustrating the analysis operation of a motion gesture which is performed in the motion analyzer of FIG. 3.
Figure 8B:
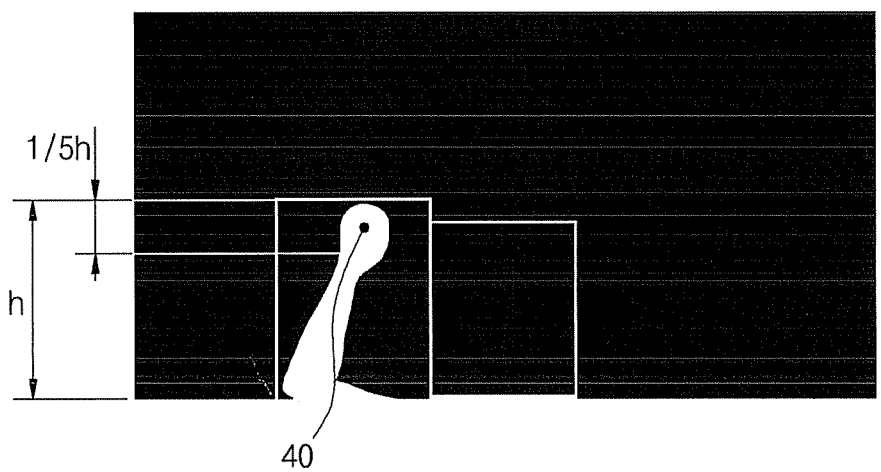
FIG. 8B is a diagram illustrating the Y coordinate of end of a hand which is shown in the operation of FIG. 8A which detects the coordinates of end of a hand.
Figure 8C:
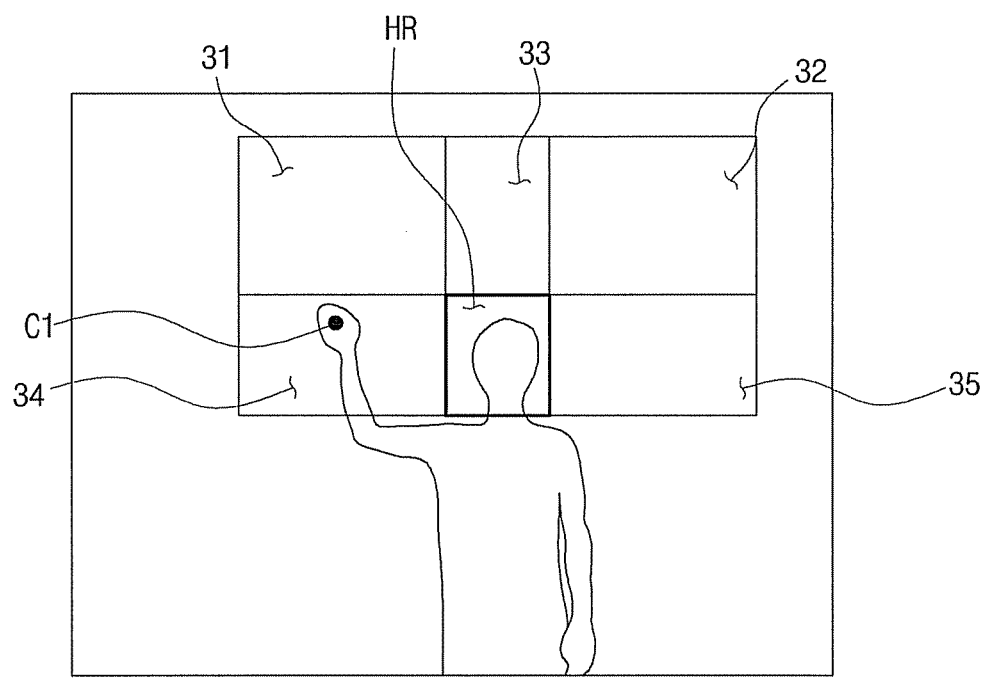
FIGS. 8C to 8E are diagrams illustrating input images which represent the moving direction of end of a hand.
Figure 8D:
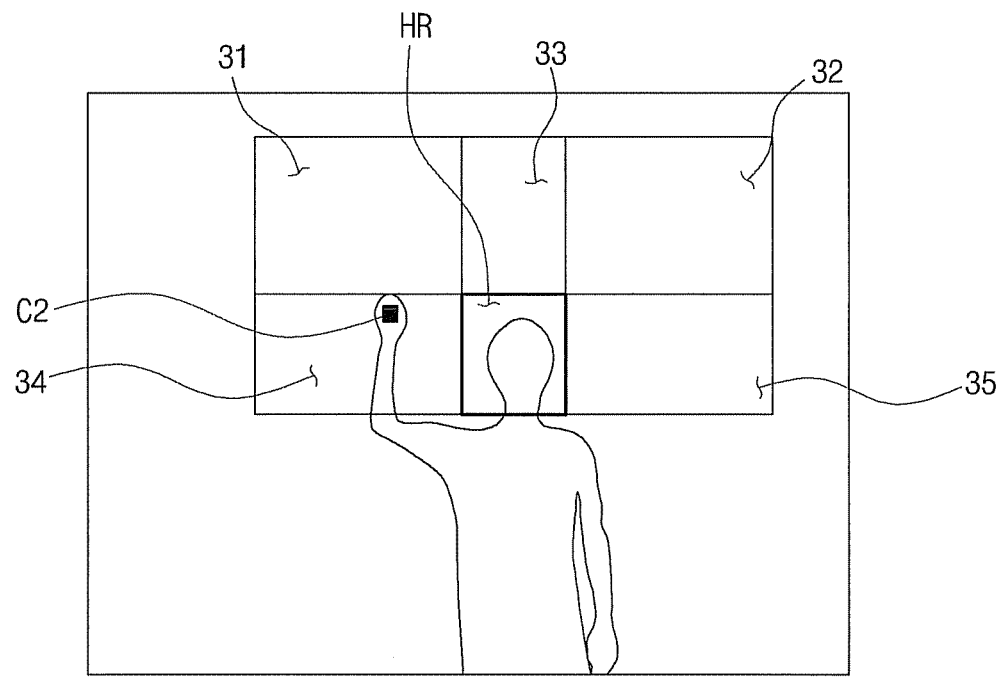
Figure 8E:
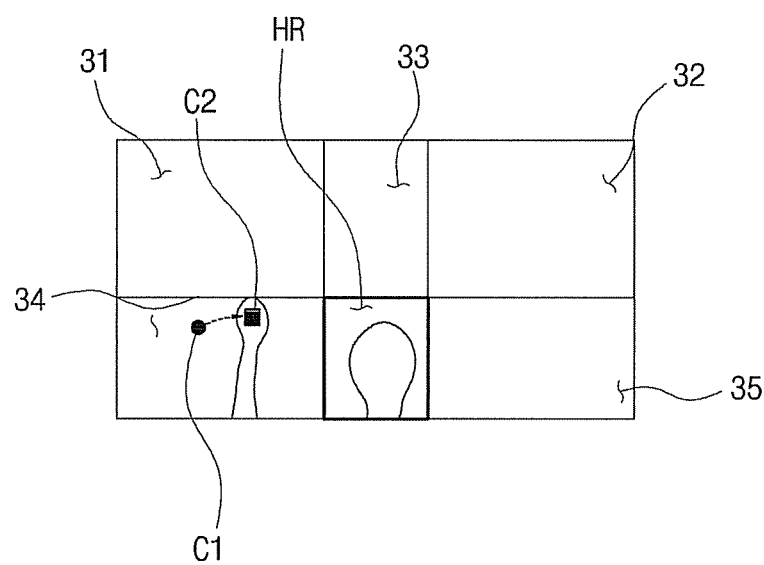

FIG. 8A is a flow chart illustrating the analysis operation of a motion gesture which is performed in the motion analyzer of FIG. 3. FIG. 8B is a diagram illustrating the Y coordinate of end of a hand which is shown in the operation of FIG. 8A which detects the coordinates of end of a hand. FIGS. 8C to 8E are diagrams illustrating input images which represent the moving direction of end of a hand.

Referring to FIG. 8A, when an input image including a right arm region that is separated through a background subtraction technique is inputted, coordinates corresponding to the end portion of a right hand in the input image are detected in operation S810. The coordinates include the Y and X coordinates of end of a hand.

The Y coordinate of end of the hand is allocated as the Y coordinate of a right arm region that is detected.

The X coordinate of end of the hand, as shown in FIG. 8B, is allocated as the barycenter value 40 of right hand region of an arm blob in the upper region "⅕ h" of entire height of the right arm region.

When the coordinates of end of the hand is detected, as shown in FIGS. 8C to 8E, the moving direction of end of the hand may be easily detected from consecutive images. In FIG. 8C, the coordinate C1 of end of the hand that is detected from a previous image is represented in a circular shape. In FIG. 8D, the coordinate C2 of end of the hand that is detected from a current image is represented in a tetragonal shape. FIG. 8E illustrates the moving direction of end of the hand which is indicated through an arrow.

Referring continuously to FIG. 8A, when the moving direction of end of the hand is detected in operation S820, and the moving direction of end of the hand is analyzed in operation S830. The moving direction of end of the hand is analyzed using a moving direction code table and a moving direction cumulative histogram. A detailed description on this will be made below with reference to FIGS. 9A and 9B.

The gesture recognition apparatus determines whether the gesture of the user is repeated from side to side or upward and downward according to a result of the analysis in operation S840. When the gesture of the user is not repeated from side to side or upward and downward, the gesture recognition apparatus proceeds to operation S810. When the gesture of the user is repeated from side to side or upward and downward, the gesture recognition apparatus determines the gesture of the user as the motion gesture that includes the waving gesture and the calling gesture in operation S850.

Figure 9A:
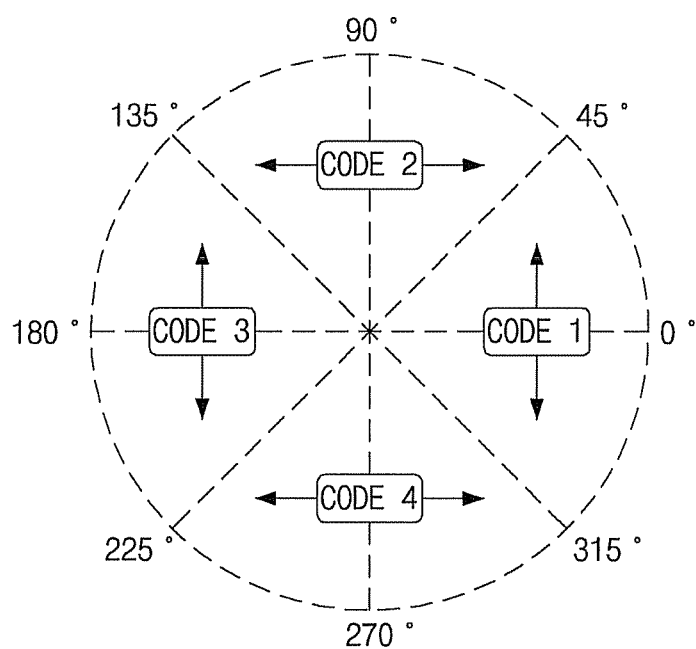
FIG. 9A is a diagram illustrating an example of a moving direction code table according to an exemplary embodiment for analyzing the moving direction of end of a hand.
Figure 9B:
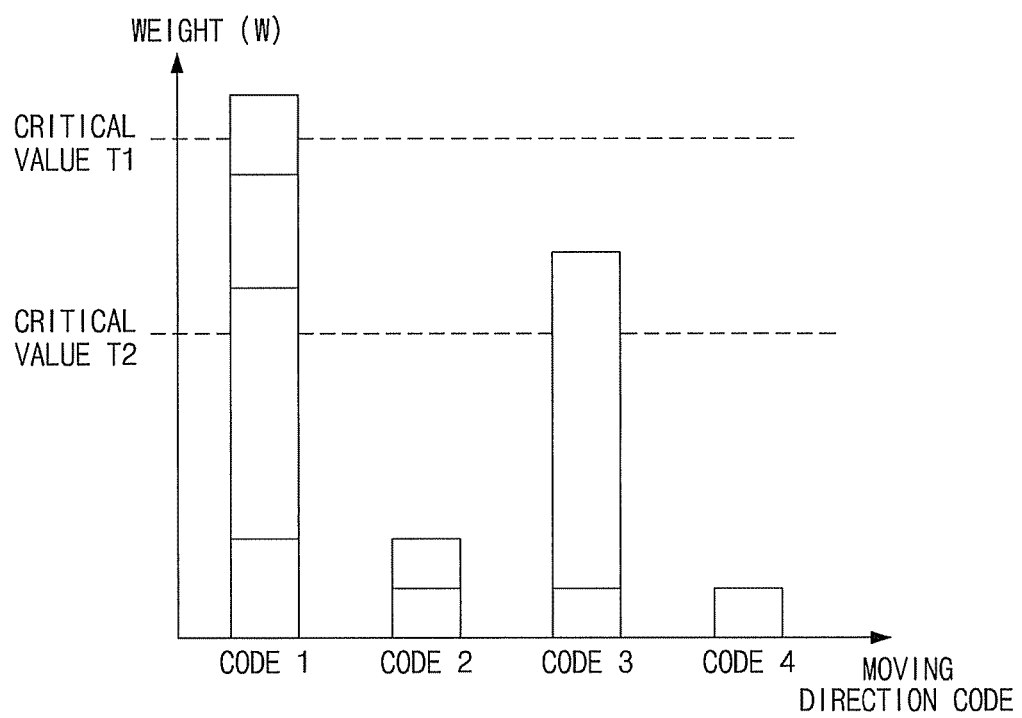
FIG. 9B is a diagram illustrating a moving direction cumulative histogram according to an exemplary embodiment for analyzing the moving direction of end of a hand.
Figure 9C:
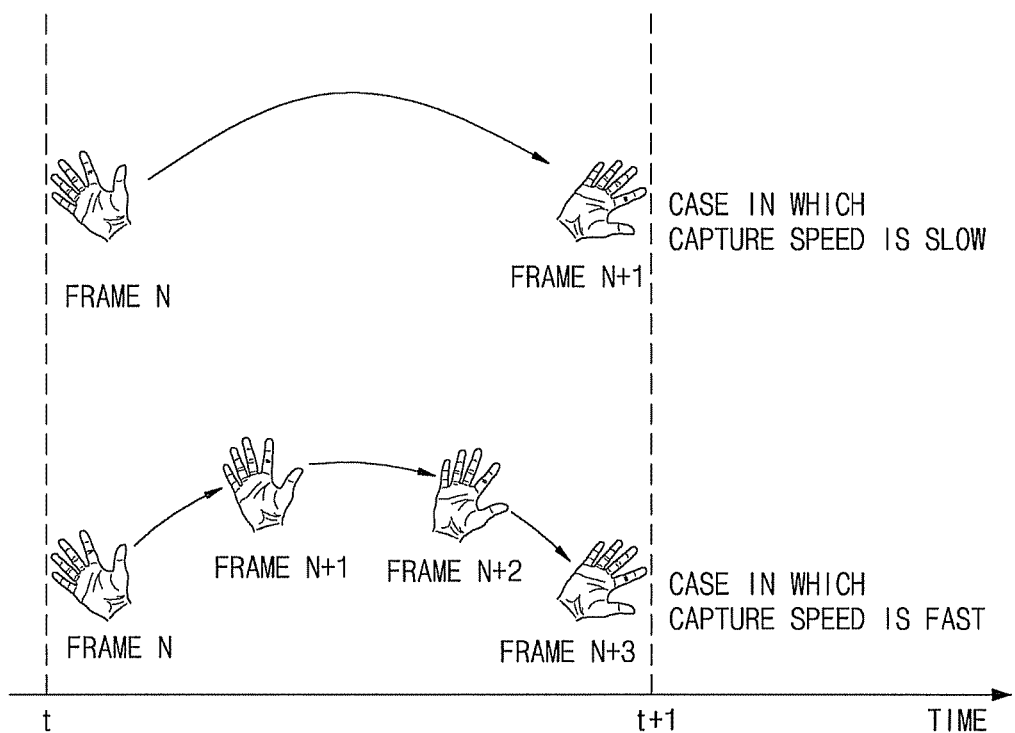
FIG. 9C is a diagram illustrating the frequency of generation of code values based on an image acquisition speed and the moving displacement of end of a hand.

FIG. 9A is a diagram illustrating an example of a moving direction code table according to an exemplary embodiment for analyzing the moving direction of end of a hand. FIG. 9B is a diagram illustrating a moving direction cumulative histogram according to an exemplary embodiment for analyzing the moving direction of end of a hand. FIG. 9C is a diagram illustrating the frequency of generation of code values based on an image acquisition speed and the moving displacement of end of a hand.

The moving direction of end of the hand is set as four code values by a moving direction code table in FIG. 9A. For example, like in FIG. 8E, when the coordinates of end of a hand move from the left to the right, because the angle of a moving direction is greater than 315 degrees and is less than 45 degrees, the code value of the moving direction is allocated as a code 1.

While input images are being continuously inputted, the code values of a moving direction are continuously calculated. As illustrated in FIG. 9B, the calculated code values of the moving direction may configure a histogram in which the code values of the moving direction are accumulated by code value.

By analyzing a histogram in which the code values of a moving direction are accumulated, whether the waving gesture 12 (see FIG. 1) and the calling gesture 14 (see FIG. 1) occur may be checked.

In the case of the waving gesture 12, since the waving gesture 12 is a behavior that repeatedly shakes a right arm from side to side, the code 1 and a code 3 which are the code values of the moving direction are mainly generated in the moving direction cumulative histogram.

Accordingly, when the code 1 (or the code 3) is greater than a predetermined critical value T1 and the code 3 (or the code 1) corresponding to the opposite direction is greater than a predetermined critical value T2, it may be determined that the waving gesture 12 (see FIG. 1) occurs. In other words, when a specific code value exceeds the critical value T1, by checking whether a code value corresponding to the opposite direction exceeds the critical value T2, a system may determine whether the waving gesture 12 (see FIG. 1) or the calling gesture 14 (see FIG. 1) occurs.

A cumulative histogram generally accumulates the frequency of generation of the code values of a moving direction. In this embodiment, however, the gesture recognition apparatus 100 calculates a weight W based on the moving speed of end of a hand as expressed in Equation (1) below instead of the frequency of generation of the code values of a moving direction, and accumulates the calculated weight to configure a histogram.

$$W = 10 \cdot \left( \frac{2 \cdot \sqrt{(x_f - x_{f+1})^2 + (y_f - y_{f+1})^2}}{\sqrt{w_{LL}^2 + h_{LL}^2}} \right) \quad (1)$$

where $x_f$ is the coordinate of end of a hand that is detected from a previous image frame, $x_{f+1}$ and $y_{f+1}$ are the coordinates of end of a hand that are detected from a current image frame, and $w_{LL}$ and $h_{LL}$ respectively represent the width and height of the LL region 34 (see FIG. 4).

Referring to FIG. 9C and according to Equation (1), as the moving displacement of end of a hand becomes faster in adjacent images, i.e., as the moving speed of end of the hand becomes higher, the weight W increases. As the moving displacement of end of the hand becomes slower in adjacent images, i.e., as the moving speed of end of the hand becomes lower, the weight W decreases.

In this embodiment, the reason that the gesture recognition apparatus 100 configures a cumulative histogram by using the weight W based on a moving speed instead of the frequency of generation of moving code values is because systems (for example, cameras) acquiring images have different image acquisition speed. That is, the reason is for stably recognizing a user's gesture at a uniform reaction speed irrespective of different image acquisition speed.

For example, when the image acquisition speed of a system, which acquires images, such as cameras is slow, the number of frames of an input image that is obtained per second is small. Accordingly, the frequency of calculation of moving direction code values decreases. In this case, if a cumulative histogram is configured with the frequency of calculation of moving direction code values, time taken until a degree of accumulation of specific code values exceeds the critical value T1 becomes longer. Consequently, much time is required until a system recognizes a user's gesture, and moreover, the user should repeat the same gesture for a long time.

On the other hand, if the image acquisition speed of a camera is fast, since the calculation amount of moving direction code values is fully obtained even though a user shakes its hand once or twice from side to side, a reaction speed in which a system recognizes a user's gesture as a target gesture increases. In this case, the possibility that a daily behavior instead of an actual waving gesture is recognized as the waving gesture 12 (see FIG. 1) may increase.

However, a cumulative histogram according to an exemplary embodiment that has a moving speed as a weight can solve the above-described limitations, and a detailed description on this will be made below with reference to FIG. 9C.

FIG. 9C is a diagram illustrating the frequency of generation of code values based on the image capture speed of an image acquisition system and the moving displacement of end of a hand.

Referring to FIG. 9C and according to Equation (1), as the moving displacement of end of a hand becomes faster in adjacent images (i.e., as the moving speed of end of the hand becomes higher), the weight W increases. As the moving displacement of end of the hand becomes slower in adjacent images (i.e., as the moving speed of end of the hand becomes lower), the weight W decreases.

If the image acquisition speed of an image acquisition system is slow, the number of input images decreases and thereby the frequency of generation of moving direction code values decreases, but the moving displacement of end of a hand increases in consecutive images and thereby the weight W enlarges. Accordingly, although the accumulated value of a corresponding code has the small frequency number, since the accumulated value of the corresponding code has a large weight W, it may have a value equal to a weight.

If the image acquisition speed of a system is fast, the frequency of generation of code values increases, but the moving displacement of end of a hand decreases in consecutive adjacent images. Accordingly, each weight W decreases, and the accumulated value of a pertinent moving direction code has a value equal to the sum of weights.

Accordingly, a system can stably recognize a user's gestures at a uniform reaction speed irrespective of an image acquisition speed.

In this embodiment, a weight W that is added to a cumulative histogram has a time stamp which is added to each histogram, and exists in the histogram only for a certain time (for example, five seconds) and thereafter is deleted.

Referring again to FIG. 3, the shape analyzer 166 analyzes shape information including the size information of a detected arm region to determine the raising gesture 16 and the stopping gesture 18 that are included in the non-motion gesture among the four target gestures 12, 14, 16 and 18 (see FIG. 1).

When an image including both arm regions is inputted, the shape analyzer 166 analyzes the relative length ratio of the both arm regions to determine whether a gesture is the raising gesture 16 or the stopping gesture 18. When the raising gesture 16 or the stopping gesture 18 is not determined, the shape analyzer 166 determines a gesture as a noise gesture. Hereinafter, a method for determining the raising gesture 16 and the stopping gesture 18 will be described in detail with reference to FIG. 10.

Figure 10:
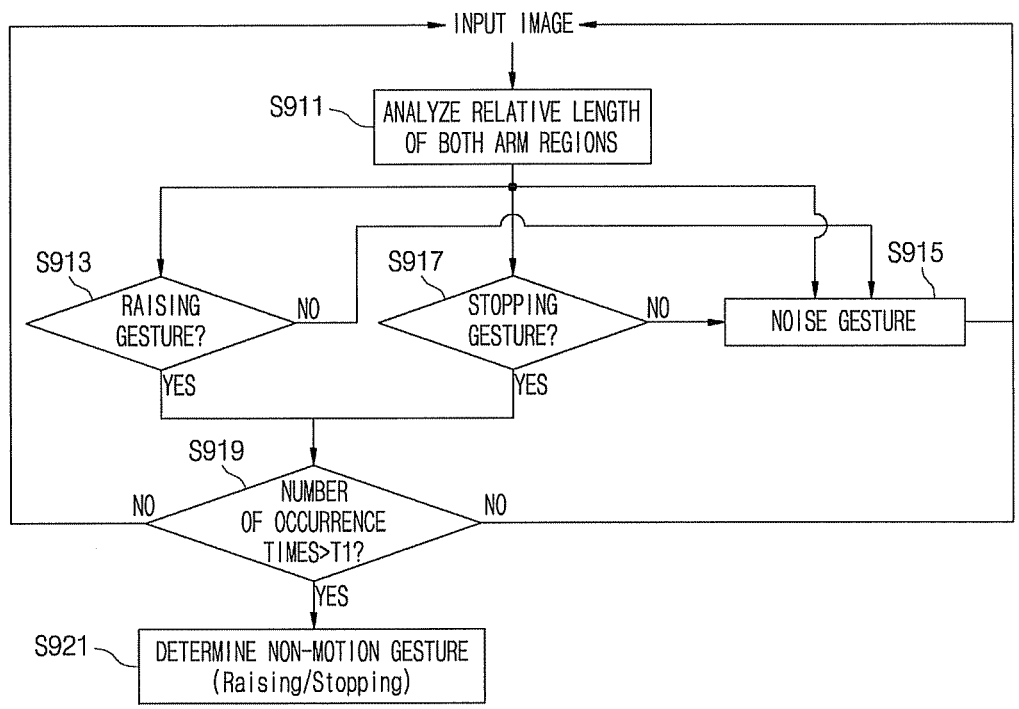
FIG. 10 is a flow chart illustrating an operation in which the shape analyzer in FIG. 3 determines a raising gesture and a stopping gesture.
Figure 11:
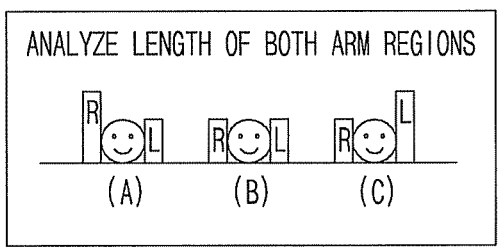
FIG. 11 is a diagram for describing an operation for analyzing the relative length of the both arm regions of FIG. 10.
Figure 12:
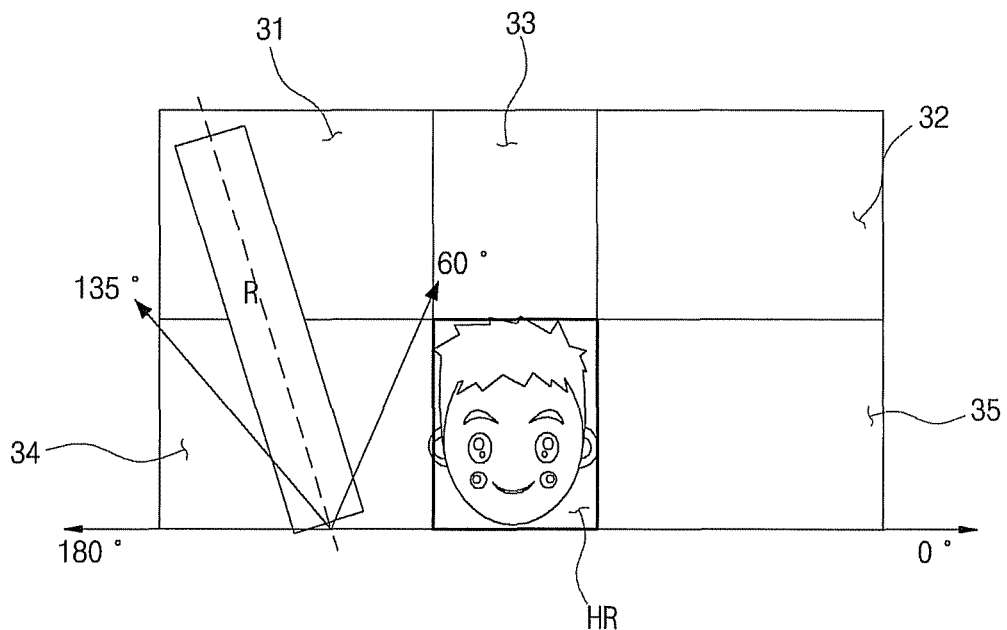
FIG. 12 is a diagram illustrating conditions for determining the raising gesture.
Figure 13:
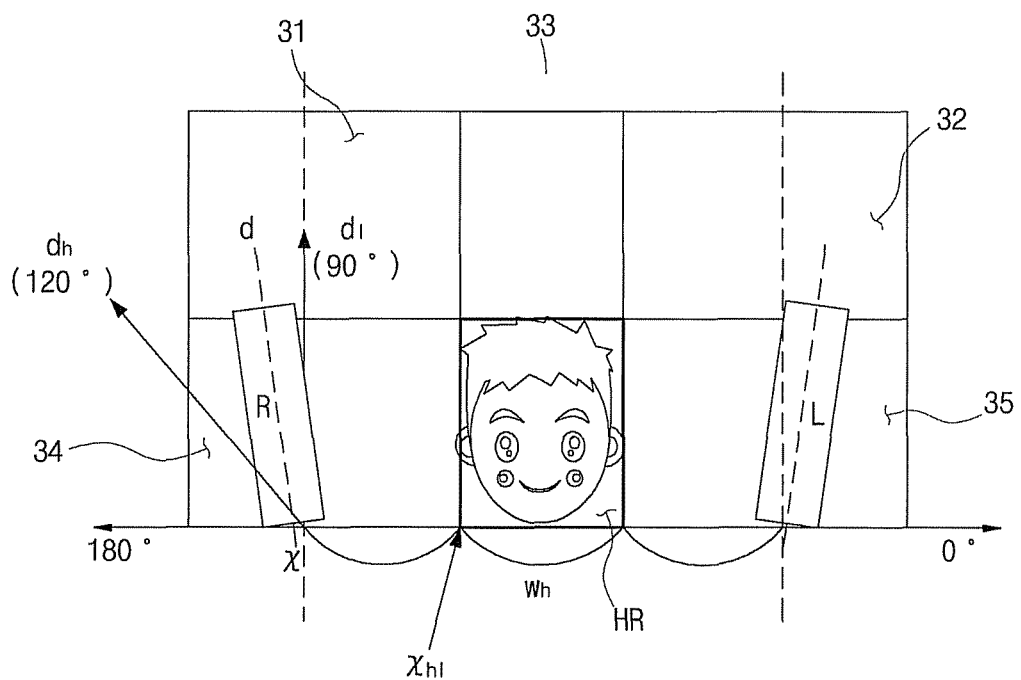
FIG. 13 is a diagram illustrating conditions for determining the stopping gesture.

FIG. 10 is a flow chart illustrating an operation in which the shape analyzer in FIG. 3 determines the raising gesture 16 and the stopping gesture 18. FIG. 11 is a diagram for describing an operation for analyzing the relative length of the both arm regions of FIG. 10. FIG. 12 is a diagram illustrating conditions for determining the raising gesture. FIG. 13 is a diagram illustrating conditions for determining the stopping gesture.

Referring to FIGS. 10 and 11, when an image is inputted, an operation for analyzing the relative length ratio of both arm regions is performed in operation S911.

In the input image, when there is no left arm (L) region or the length of a right arm (R) region is greater by two orders or more of magnitude than that of the left arm region, as shown in FIG. 11(A), a user's gesture is determined as the raising gesture 16 (see FIG. 1). In the input image, when there is no right arm (R) region or the length of a left arm (L) region is greater by two orders or more of magnitude than that of the right arm region, as shown in FIG. 11(C), a user's gesture is determined as a noise gesture in operation S915.

In the input image, when the length of a right arm (R) region is the almost same as that of a left arm (L) arm, as shown in FIG. 11(B), a user's gesture is determined as the stopping gesture 18 (see FIG. 1) in operation S917.

In an operation of determining the raising gesture 16 (see FIG. 10), the shape analyzer 166 may simply analyze the length and angle of a left arm region to determine whether a gesture is the raising gesture or the noise gesture in operation S913.

In this embodiment, as shown in FIG. 12, when the length of a right arm (R) region is greater than approximately 1.3 times the vertical height of head region HR of a user and the angle of a right arm (R) is from a first angle (for example, 60 degrees) to a second angle (for example, 135 degrees), a user's gesture is determined as the raising gesture in operation S913. When these conditions are satisfied, all the user's gestures are determined as noise gestures in operation S915.

By analyzing the lengths, angles and positions of the both arm (R and L) regions, the stopping gesture or the noise gesture is determined in operations S915 and S917.

When all the upper portions of the both arm regions are near the vertical upper portion of head region FIR of the user (i.e., a daily behavior in which a user touches its head with its two hands) and there is an arm in which the length of an arm region is greater than 1.6 times the vertical height of head region HR of the user, a user's gesture is determined as the noise gesture in operation S915.

In the body structure of the human, when the angles of both hands of the human are less than or the same as 90 degrees, there is high possibility that a user's gesture is the stopping gesture.

On the other hand, as the angles of both hands of the human enlarge more than 90 degrees, there is much possibility that a user's gesture is a daily behavior instead of the stopping gesture.

As shown in FIG. 13, when the hand regions of a user respectively exist in both positions that are separated by the horizontal length of a head region HR, there is highest possibility that a user's gesture is the stopping gesture, and as a displacement in this position enlarges, the possibility is degraded. That is, when the angle of a left arm (L) exceeds 90 degrees and the angle of a right arm (R) is less than 90 degrees, there is highest possibility that a user's gesture is not the stopping gesture.

Accordingly, as expressed in Equations below, the gesture recognition apparatus calculates the values of possibility ($P_d$ and $P_p$) that a user's gesture is the stopping gesture on the basis of the angles and positions of hand regions. The gesture recognition apparatus determines a user's gesture as the stopping gesture when the final possibility value (P) is greater than a predetermined critical value on the basis of the possibility values ($P_d$ and $P_p$), and otherwise, it determines a user's gesture as the noise gesture.

$$P_d = 1 - \frac{\text{Max}(d, d_l) - d_l}{d_h - d_l} \quad (2)$$

where $P_d$ is the value of possibility that a current arm region based on angle information is the stopping gesture, d is the angle value of an arm region, and $d_l$ and $d_h$ are the allowance angles of gestures and respectively are 90 and 120 degrees.

$$P_p = \frac{\text{Min}(|x - x_{hl} + w_h|, w_h)}{w_h} \quad (3)$$

where $P_p$ is the value of possibility that a current arm region based on angle information is the stopping gesture, x is the X coordinate of an arm region, $x_{hl}$ is the X coordinate of a left boundary of a head region, and $w_h$ represents the width of the head region.

$$P = \alpha P_d + (1-\alpha) P_p \quad (4)$$

where P is the value of final possibility that a current arm region is the stopping gesture, and α is a weight.

According to Equation (2), as a result, when the angle of the right arm region is less than 90 degrees and the angle of the left arm region is more than 90 degrees, the value of possibility ($P_d$) that the user's gesture is the stopping gesture increases. When the angle of the right arm region exceeds 90 degrees and the angle of the left arm region is less than 90 degrees, the value of possibility ($P_d$) that the user's gesture is the stopping gesture decreases.

According to Equation (3), when the position of the right arm region and the position of the left arm region are separated by the width of the head region with respect to the head region HR, the value of possibility that the user's gesture is the stopping gesture is the maximum, and as a displacement in a corresponding position enlarges, the value of possibility that the user's gesture is the stopping gesture decreases.

According to Equation (4), the value of possibility that the user's gesture is the stopping gesture may be calculated on the basis of the angle and position of the right arm region and the angle and position of the left arm region.

When the number of times the raising gesture and the stopping gesture occur exceeds a predetermined critical value (T1) in operation S919, a system finally determines that the non-motion gesture occurs in operation S921.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A gesture recognition apparatus, comprising:
a camera detecting an input image;
a human detection unit detecting a face region of a user from the input image;
a gesture region setting unit setting a gesture region, in which a gesture of the user's arm occurs, with respect to the detected face region;
an arm detection unit detecting an arm region of the user in the gesture region; and
a gesture determination unit analyzing a position, moving directionality and shape information of the arm region in the gesture region to determine a target gesture of the user,
wherein the gesture region setting unit sets the gesture region which comprises a left upper region which is disposed in an left upper portion of the head region, a right upper region which is disposed in a right upper portion of the head region, a center upper region which is adjacent to the head region and is disposed between the left upper region and the right upper region, a left lower region which is adjacent to the head region and is disposed at a lower portion of the left upper region, and a right lower region which is adjacent to the head region and is disposed at a lower portion of the right upper region, with respect to a position of a head region comprising the face region,
wherein the gesture determination unit determines the target gesture which comprises a waving gesture which repeatedly shakes any one of a right arm and left arm of the user from side to side, a calling gesture which repeatedly shakes any one of the right arm and left arm of the user upward and downward, a raising gesture which maintains a state, where the user is holding up any one of the right and left arms to at least face height, for a certain time, and a stopping gesture which maintains a state, where the user is holding up the right and left arms to face height, for a certain time.

2. The gesture recognition apparatus of claim 1, wherein the gesture determination unit comprises:
a region analyzer determining whether the position of the arm region of the user is in the gesture region to discriminate the target gesture and a noise gesture which corresponds to a daily behavior of the user,
a motion analyzer analyzing the moving directionality of the arm region of the user to discriminate the waving gesture and the calling gesture; and
a shape analyzer analyzing the shape information which comprises a relative length ration and angle of the right and left arms of the user to discriminate the raising gesture and the stopping gesture.

3. The gesture recognition apparatus of claim 2, wherein the region analyzer determines the target gesture and the noise gesture with a lookup table in which the target gesture and the gesture region are configured per item.

4. The gesture recognition apparatus of claim 2, wherein the motion analyzer detects coordinates of end of a hand of the arm region, analyzes a moving direction and speed of the detected coordinates of end of the hand to set a moving direction code value, and determines the waving gesture and the calling gesture on the basis of an accumulated value of the set moving direction code value.

5. The gesture recognition apparatus of claim 2, wherein in a case where the user expresses the raising gesture with the right arm, the shape analyzer determines the gesture of the user as the raising gesture, when there is no left arm region in the right lower region and a length of a right arm region, which exists across the left lower and upper regions, is greater by two orders or more of magnitude than a length of the left arm region, and
the shape analyzer determines the gesture of the user as the noise gesture, when there is no right arm region in the left lower region and a length of a left arm region in the right upper region is greater than a length of the right arm region.

6. The gesture recognition apparatus of claim 5, wherein the shape analyzer determines the gesture of the user, when a length of a right arm region in the left lower region is greater than approximately 1.3 times a vertical height of the head region and an angle of the right arm is from about 60 degrees to about 135 degrees.

7. The gesture recognition apparatus of claim 2, wherein:
the shape analyzer determines the gesture of the user as the stopping gesture, when a length of a right arm region in the left lower region is the substantially same as a length of a left arm region in the right lower region, and
the shape analyzer determines the gesture of the user as the noise gesture, when the length of the right arm region and the length of left arm region are greater than a predetermined multiple of a height of the head region.

8. The gesture recognition apparatus of claim 7, wherein:
a value of possibility that the gesture of the user is the stopping gesture is the maximum, when an angle of the right arm region is equal to or less than about 90 degrees and an angle of the left arm region is equal to more than about 90 degrees, and
a value of possibility that the gesture of the user is the stopping gesture decreases, when the angle of the right arm region exceeds about 90 degrees and the angle of the left arm region is less than about 90 degrees.

9. The gesture recognition apparatus of claim 7, wherein:
a value of possibility that the gesture of the user is the stopping gesture is the maximum, when a position of the right arm region and a position of the left arm region are separated by a width of the head region with respect to the head region, and
as a displacement in a corresponding position enlarges, a value of possibility that the gesture of the user is the stopping gesture decreases.

10. The gesture recognition apparatus of claim 7, wherein the shape analyzer a value of possibility that the gesture of the user is the stopping gesture on the basis of an angle and position of the right arm region and an angle and position of the left arm region.

11. A gesture recognition method using a robot system which includes a moving means and in which a human-robot interaction technology is implemented, the gesture recognition method comprising:
detecting a face region of a user from an input image which is sequentially inputted;
calculating, executed by a processor, a size of a gesture region, in which a gesture of the user's arm occurs, at a certain rate on the basis of a position and size of the detected face region;
acquiring a background subtraction image which comprises an arm region of the user in the calculated gesture region;
detecting the arm region of the user in the gesture region by using the acquired background subtraction image; and
analyzing a position, moving directionality and posture of the arm region in the gesture region to determine a target gesture of the user which comprises a waving gesture, a calling gesture, a raising gesture and a stopping gesture, wherein the determining of a target gesture comprises:

determining whether an arm region of the user is in the gesture region with a lookup table, in which the target gesture and the gesture region are configured per item, to determine a noise gesture which corresponds to the target gesture and a daily behavior of the user according to a result of the determination;

detecting coordinates of end of a hand of the arm region, in the gesture region;

analyzing a moving direction and speed of the detected coordinates of end of the hand to set a moving direction code value, and determining the waving gesture and the calling gesture on the basis of an accumulated value of the set moving direction code value; and analyzing the shape information, which comprises a length rate and angle of right and left arms of the user, to determine the raising gesture and the stopping gesture.

* * * * *